US010578958B2

(12) United States Patent
Wu et al.

(10) Patent No.: US 10,578,958 B2
(45) Date of Patent: Mar. 3, 2020

(54) LIGHT SOURCE SYSTEM OF A LASER PROJECTOR

(71) Applicant: QISDA CORPORATION, Taoyuan (TW)

(72) Inventors: Tien-Hsueh Wu, New Taipei (TW); Ching-Shuai Huang, Taoyuan (TW)

(73) Assignee: Qisda Corporation, Taoyuan (TW)

(*) Notice: Subject to any disclaimer, the term of this patent is extended or adjusted under 35 U.S.C. 154(b) by 44 days.

(21) Appl. No.: 15/831,396

(22) Filed: Dec. 5, 2017

(65) Prior Publication Data

US 2018/0157157 A1    Jun. 7, 2018

(30) Foreign Application Priority Data

Dec. 5, 2016   (CN) .......................... 2016 1 1103892

(51) Int. Cl.
*F21V 7/04* (2006.01)
*G03B 21/20* (2006.01)
*G02B 26/00* (2006.01)
*G02B 27/14* (2006.01)
*G02B 27/30* (2006.01)
*F21V 8/00* (2006.01)

(52) U.S. Cl.
CPC ......... *G03B 21/208* (2013.01); *G02B 26/008* (2013.01); *G02B 27/149* (2013.01); *G03B 21/204* (2013.01); *G03B 21/2033* (2013.01); *G03B 21/2066* (2013.01); *G02B 6/0001* (2013.01); *G02B 27/30* (2013.01); *G03B 21/2013* (2013.01)

(58) Field of Classification Search
CPC ..... G02B 2006/12121; G09F 1/133553; G09F 2001/1352; G09F 13/165

USPC ................................................. 362/553, 560
See application file for complete search history.

(56) References Cited

U.S. PATENT DOCUMENTS

| 2014/0347634 | A1* | 11/2014 | Bommerbach | ...... H04N 9/3158 353/31 |
| 2016/0103387 | A1* | 4/2016 | Nishimori | ............. G03B 21/16 353/38 |
| 2016/0349606 | A1* | 12/2016 | Nishimori | ............ G02B 26/008 |
| 2017/0192347 | A1* | 7/2017 | Huang | ................. G02B 6/0006 |

FOREIGN PATENT DOCUMENTS

| CN | 101201458 A | 6/2008 |
| CN | 102385232 A | 3/2012 |
| CN | 102478754 A | 5/2012 |
| CN | 105467734 A | 4/2016 |
| TW | 200916824 | 4/2009 |
| TW | 201409155 A | 3/2014 |

* cited by examiner

*Primary Examiner* — Daniel St Cyr

(57) ABSTRACT

A first laser module generates a first light beam along a first light path. A second laser module generates a second light beam along a second light path. A light-guiding module reflects the first light beam to generate a first reflected light beam along a third light path and reflects the second light beam to generate a second reflected light beam along a fourth light path. A wavelength conversion layer of the wavelength conversion device is stimulated by the first reflected light beam to generate a stimulated light beam against the first reflected light beam. The light-guiding module directs the stimulated light beam to the fourth light path. A light rod integrates the stimulated light beam and the second reflected light beam to generate an integrated light beam.

13 Claims, 13 Drawing Sheets

LIGHT SOURCE SYSTEM OF A LASER PROJECTOR

BACKGROUND OF THE INVENTION

1. Field of the Invention

The invention relates to a light source system. More particularly, the invention relates to a light source system of a laser projector.

2. Description of the Prior Art

With the ever-changing technology, laser technology is gradually becoming more and more mature and is used as the light source of a light source system of a projector. However, in the light of the needs of a lightweight and compact projector, the prior art projector with a laser light source is huge and lacks of flexibility.

Please refer to FIG. 1. FIG. 1 is a schematic diagram of a light source system 10 of a projector according to the prior art. The light source system 10 is used as a light source of a projector and generates a laser beam Ba with S polarization via a laser module 12. The laser beam Ba is reflected to a lens L1 and a phosphor wheel 15 by a dichroic mirror 14. Please refer to FIG. 2. FIG. 2 is a schematic diagram of the phosphor wheel 15. The phosphor wheel 15 comprises a penetration area 24 allowing the laser beam Ba to pass through. In addition, the phosphor wheel 15 further comprises a phosphor coating area 25 (illustrated with slashes). When the laser beam Ba is projected onto the phosphor coating area 25, phosphors on the phosphor coating area 25 are stimulated by the laser beam Ba to generate a fluorescent light beam F. The fluorescent light beam F passes through the dichroic mirror 14 and a lens L5 to a light rod 22. A driving device 17 of the light source system 10 rotates the phosphor wheel 15. Due to the penetration area 24 of the phosphor coating area 25, portions of the laser beam Ba pass through the penetration area 24 and a lens L2 to a relay system 30. The relay system 30 comprises three reflectors 16, 18 and 20 and two lenses L3 and L4 to guide the laser beam Ba passing through the penetration area 24 to the dichroic mirror 14. The laser beam Ba guided by the relay system 30 would be reflected by the dichroic mirror 14 to the light rod 22 through the lens L5. The fluorescent light beam F and the laser beam Ba passing through the penetration area 24 are mixed in the light rod 22 to generate a white light beam needed by a projecting system 50 of the projector. Based on the foresaid operations of the light source system 10, due to the rotating phosphor wheel 15 with the penetration area 24, the fluorescent light beam F and the laser beam Ba alternately enter the light rod 22. An angle θ corresponding to the penetration area 24 affects a ratio of durations when the fluorescent light beam F and the laser beam Ba respectively enter the light rod 22, and the spectral energy distribution of a light beam outputted from the light rod 22 would be affected accordingly.

An advantage of the light source system 10 is that the light source system 10 may output a white light beam by using a single laser module 12. However, due to the relay system 30 of the light source system 10 for guiding the laser beam Ba passing through the penetration area 24 to the dichroic mirror 14, the light source system 10 needs numerous optical elements. As a result, the light source system 10 has a huge size. Moreover, since the laser module 12 is the sole energy source for generating the fluorescent light beam F, and the ratio of durations when the fluorescent light beam F and the laser beam Ba respectively enter the light rod 22 is affected by the angle θ, it is difficult to adjust the spectral energy distribution of the white light beam outputted from the light rod 22 to the projecting system 50.

SUMMARY OF THE INVENTION

An embodiment of the present invention provides a light source system of a laser projector for generating an integrated light beam. The light source system comprises a first laser module, a second laser module, a first light-guiding module, a first wavelength conversion device and a light rod. The first laser module is used to generate a first light beam along a first light path. The second laser module is used to generate a second light beam along a second light path. The first light-guiding module is used to reflect the first light beam to generate a first reflected light beam along a third light path and used to reflect the second light beam to generate a second reflected light beam along a fourth light path. The first wavelength conversion device has a first wavelength conversion layer used to be stimulated by the first reflected light beam to generate a first stimulated light beam traveling against the first reflected light beam. The first light-guiding module directs the first stimulated light beam to the fourth light path. The light rod is used to integrate the first stimulated light beam and the second reflected light beam to generate the integrated light beam.

According to the embodiments of the present invention, the light source system operates without a relay system, so the size of the light source system could be reduced substantially. Moreover, since the light source system has two laser modules, the spectral energy distribution of the integrated light beam outputted from the light source system could be adjusted easily to fit various projection demands by adjusting the output power of the two laser modules.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
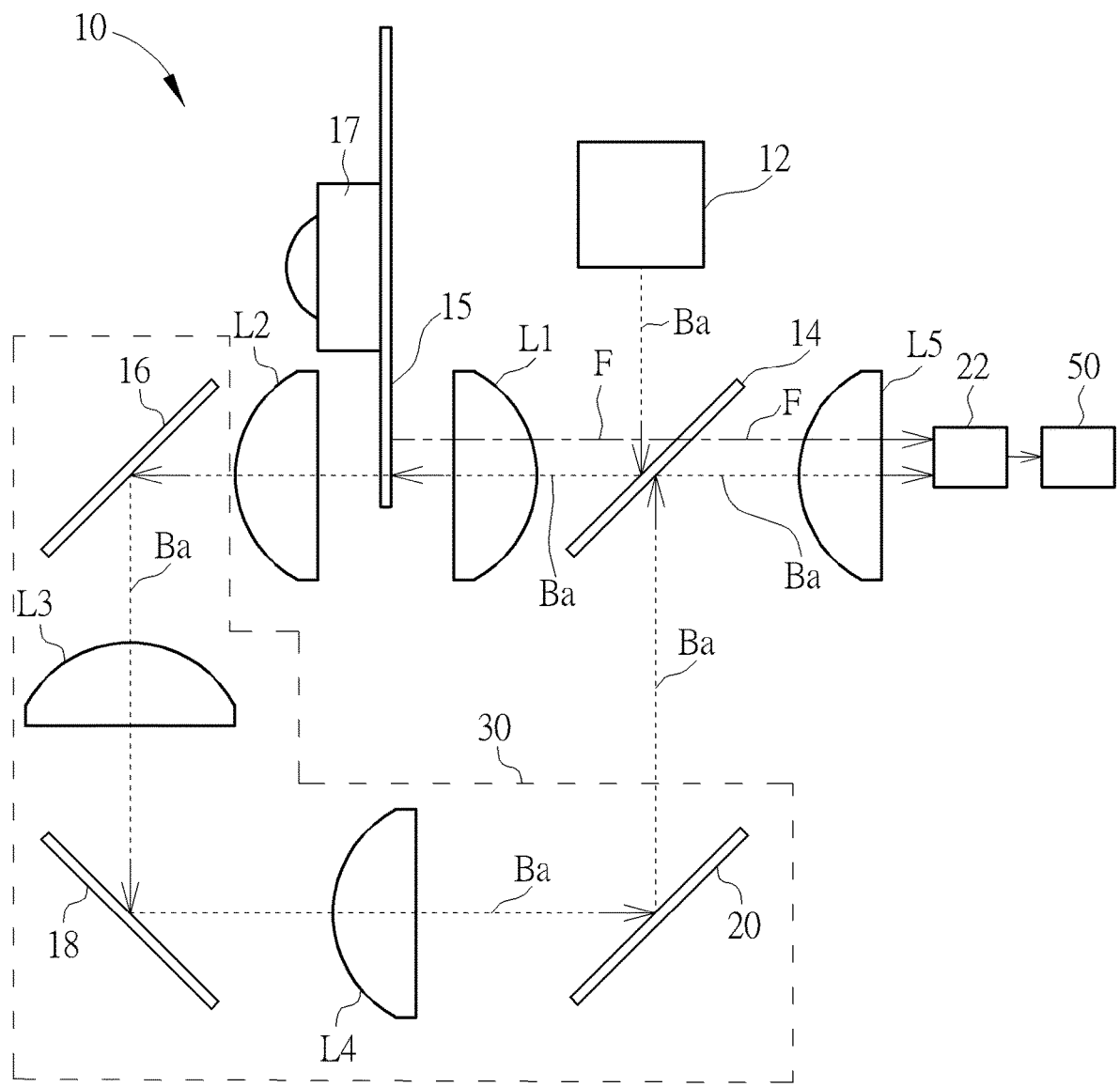
FIG. 1 is a schematic diagram of a light source system of a projector according to the prior art.
Figure 2:
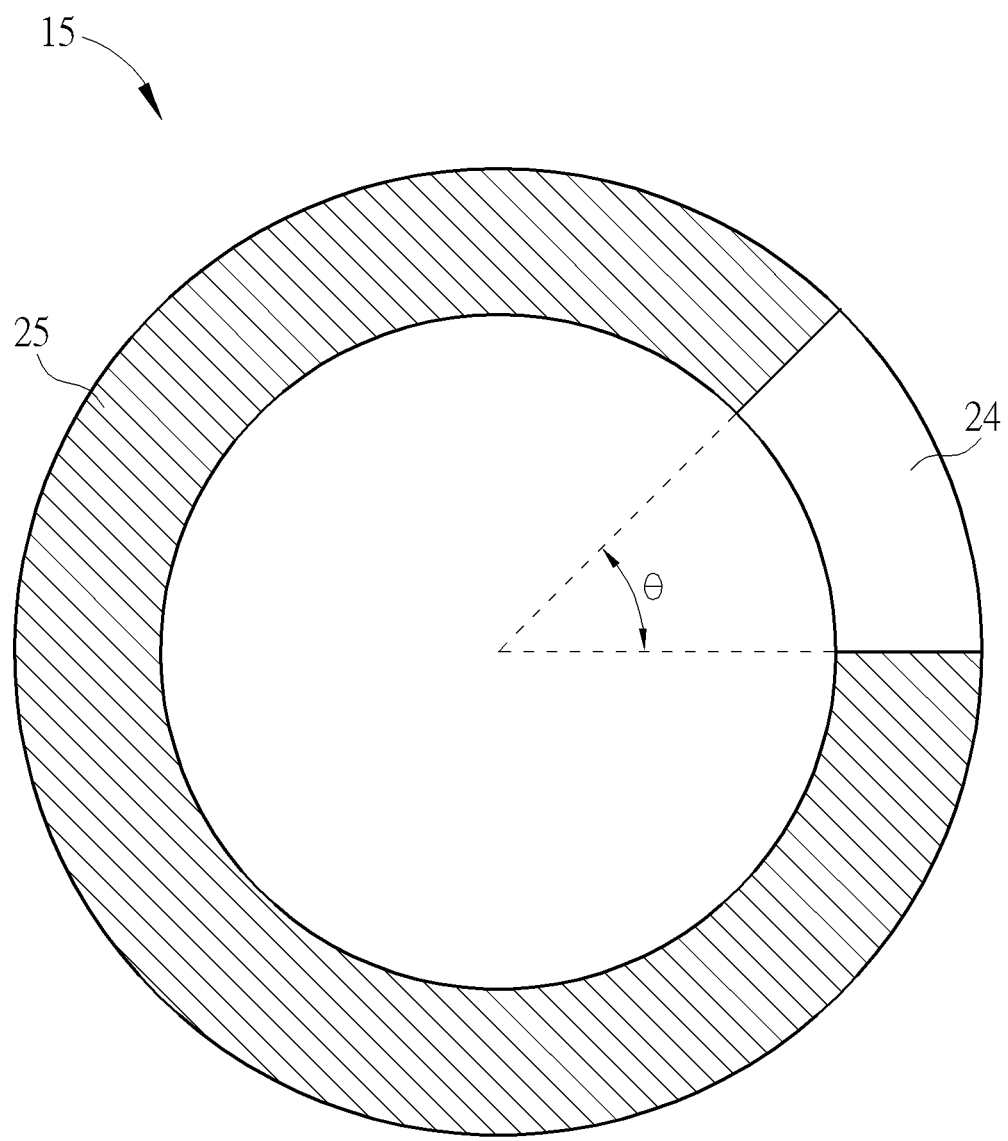
FIG. 2 is a schematic diagram of a phosphor wheel shown in FIG. 1.
Figure 3:
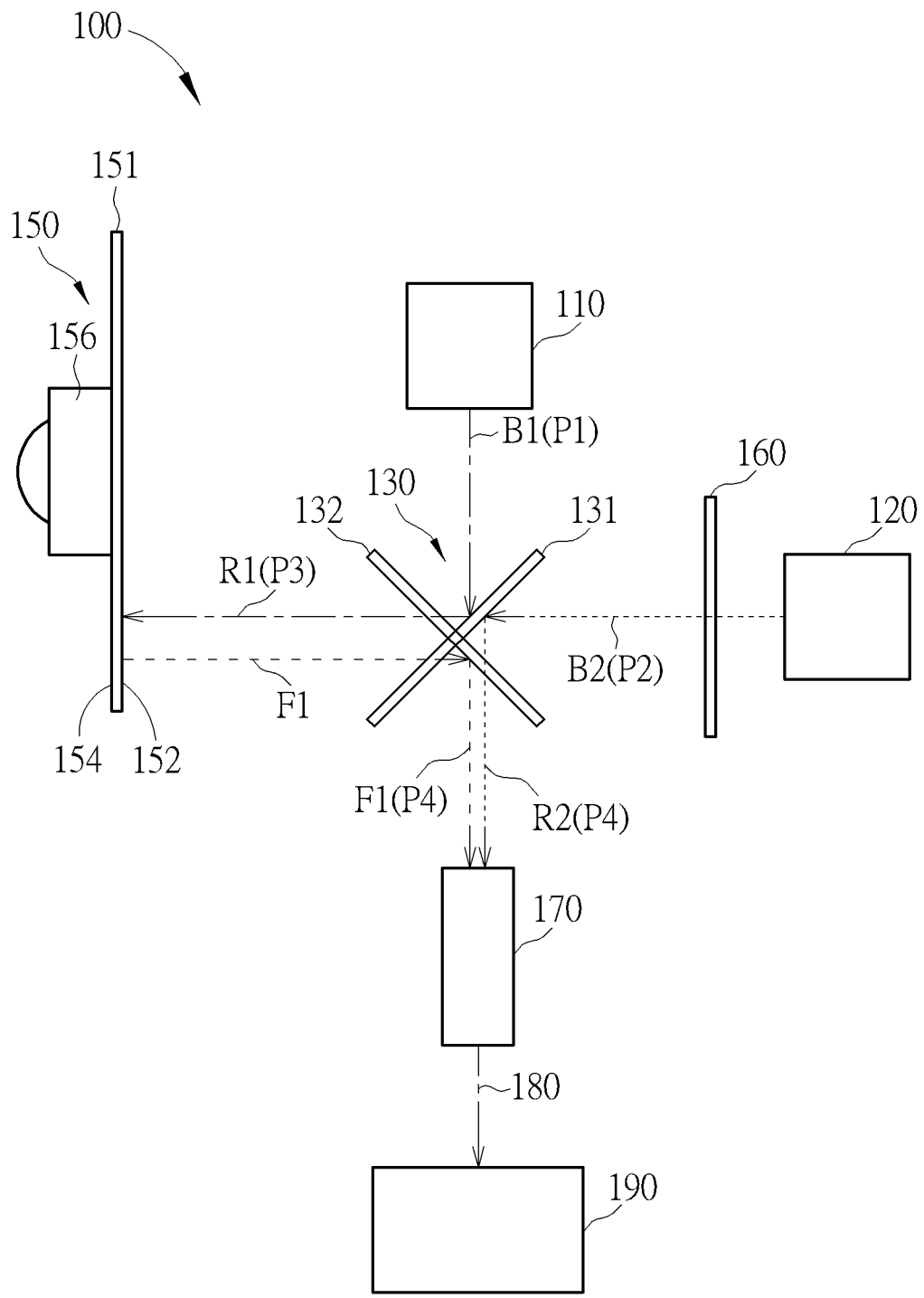
FIG. 3 is a schematic diagram of a light source system of a projector according an embodiment of the present invention.

Please refer to FIG. 3. FIG. 3 is a schematic diagram of a light source system 100 of a laser projector according an embodiment of the present invention. The light source system 100 is used to generate and provide an integrated light beam 180 to a projecting system 190 of the laser projector. The projecting system 190 may be a liquid crystal on silicon (LCOS) projecting system or a three digital light processing (3DLP) projecting system. The light source system 100 comprises a first laser module 110, a second laser module 120, a first light-guiding module 130, a first wavelength conversion device 151 and a light rod 170. The first laser module 110 is configured to generate a first light beam B1 along a first light path P1. The second laser module 120 is configured to generate a second light beam B2 along a second light path P2. The first light-guiding module 130 is configured to reflect the first light beam B1 to generate a first reflected light beam R1 along a third light path P3 and is configured to reflect the second light beam B2 to generate a second reflected light beam R2 along a fourth light path P4. The first wavelength conversion device 151 has a first wavelength conversion layer 152 configured to be stimulated by the first reflected light beam R1 to generate a first stimulated light beam F1 traveling against the first reflected light beam R1. The first light-guiding module 130 guides the first stimulated light beam F1 to the fourth light path P4. The light rod 170 is configured to integrate the first stimulated light beam F1 and the second reflected light beam R2 to generate the integrated light beam 180.

In the embodiment, the first light path P1 is perpendicular to both the second light path P2 and the third light path P3 and is parallel with the fourth light path P4. The second light path P2 is parallel with the third light path P3 and is perpendicular to the fourth light path P4. The third light path P3 is perpendicular to the fourth light path P4. In addition, the first light-guiding module 130 comprises a first dichroic layer 131 and a second dichroic layer 132. The first dichroic layer 131 and the second dichroic layer 132 are disposed in perpendicular to one another and applied to an optical element to form an X-Plate or an X-Cube. The first dichroic layer 131 is configured to reflect the first light beam B1 and the second light beam B2 to generate the first reflected light beam R1 and the second reflected light beam R2 respectively. The first dichroic layer 131 allows the first stimulated light beam F1 to pass through. The second dichroic layer 132 is configured to reflect the first stimulated light beam F1 to redirect the first stimulated light beam F1 to the fourth light path P4. Moreover, the second dichroic layer 132 allows the first reflected light beam R1 and the second reflected light beam R2 to pass through. Since the light source system 100 may operate without using the relay system of the prior art projector, the size the light source system 100 could be reduced substantially. In addition, since the light source system 100 has the first laser module 110 and the second laser module 120, the spectral energy distribution of the integrated light beam 180 outputted from the light source system 100 could be dynamically adjusted to fit various projection demands by adjusting the output power of the first laser module 110 and/or the second laser module 120 and/or by adjusting numbers of laser diodes of the first laser module 110 and the second laser module 120.

Figure 4:
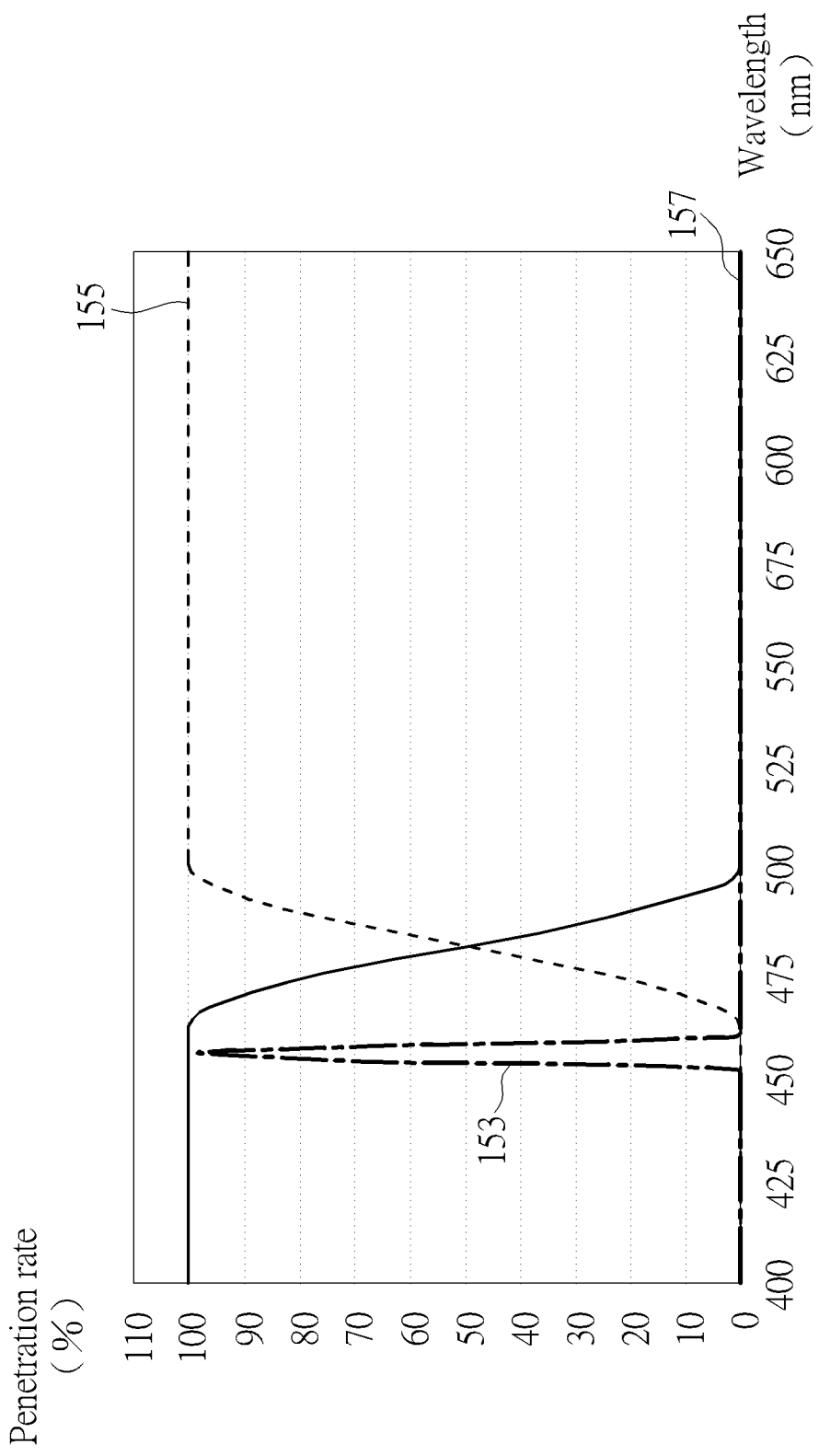
FIG. 4 is a diagram showing the optical characteristics of two dichroic layers according to an embodiment of the present invention.

In an embodiment of the present invention, the first laser module 110 and the second laser module 120 may be blue laser modules, and the first light beam B1, the second light beam B2, the first reflected light beam R1 and the second reflected light beam R2 may be blue laser beams. However, the first laser module 110 and the second laser module 120 may be ultraviolet laser modules for generating ultraviolet laser beams or near ultraviolet laser modules for generating near ultraviolet laser beams. When the first (blue) reflected light beam R1 is projected onto the first wavelength conversion device 151, the first wavelength conversion layer 152 of the first wavelength conversion device 151 performs a wavelength conversion on the first reflected light beam R1 to make the wavelength of the first stimulated light beam F1 different from the wavelength of the first reflected light beam R1. In an embodiment of the present invention, the first wavelength conversion layer 152 is a phosphor layer coated on the first wavelength conversion device 151. In another embodiment of the present invention, the first wavelength conversion layer 152 comprises a plurality of quantum dots, each of which receives a part of the second light beam B2 to generate a part of the first stimulated light beam F1. Since the first dichroic layer 131 and the second dichroic layer 132 have different optical characteristics, and the first reflected light beam R1 and the first stimulated light beam F1 have different wavelengths, the first dichroic layer 131 and the second dichroic layer 132 have different reactions on the first reflected light beam R1 and the first stimulated light beam F1. Please refer to FIG. 4. FIG. 4 is a diagram showing the optical characteristics of the first dichroic layer 131 and the second dichroic layer 132 according to an embodiment of the present invention. A curve 153 represents a wavelength distribution of the first light beam B1, the second light beam B2, the first reflected light beam R1 and the second reflected light beam R2 if the first light beams B1, the second light beam B2, the first reflected light beam R1 and the second reflected light beam R2 are blue light beams. A curve 155 represents the optical characteristic of the first dichroic layer 131, and a curve 157 represents the optical characteristic of the second dichroic layer 132. In the light of the curve 153, the wavelengths of the first light beam B1, the second light beam B2, the first reflected light beam R1 and the second reflected light beam R2 are around 460 nm. In addition, the wavelength of the first stimulated light beam F1 is substantially greater than 500 nm. In the light of the curve 155, the penetration rates of the first light beam B1 and the second light beam B2 through the first dichroic layer 131 is about 0%, and the penetration rate of the first stimulated light beam F1 through the first dichroic layer 131 is about 100%. Therefore, the first dichroic layer 131 reflects the first light beam B1 and the second light beam B2 to generate the first reflected light beam R1 and the second reflected light beam R2, and the first dichroic layer 131 allows the first stimulated light beam F1 to pass through. In the light of the curve 157, the penetration rates of the first light beam B1, the second light beam B2, the first reflected light beam R1 and the second reflected light beam R2 through the second dichroic layer 132 are about 100%, and the penetration rate of the first stimulated light beam F1 through the second dichroic layer 132 is about 0%. Therefore, the second dichroic layer 132 allows the first light beam B1, the second light beam B2, the first reflected light beam R1 and the second reflected light beam R2 to pass through and reflects the first stimulated light beam F1 from the first wavelength conversion device 151 to the light rod 170.

In an embodiment of the present invention, the first wavelength conversion device 151 is a phosphor wheel.

Figure 5:
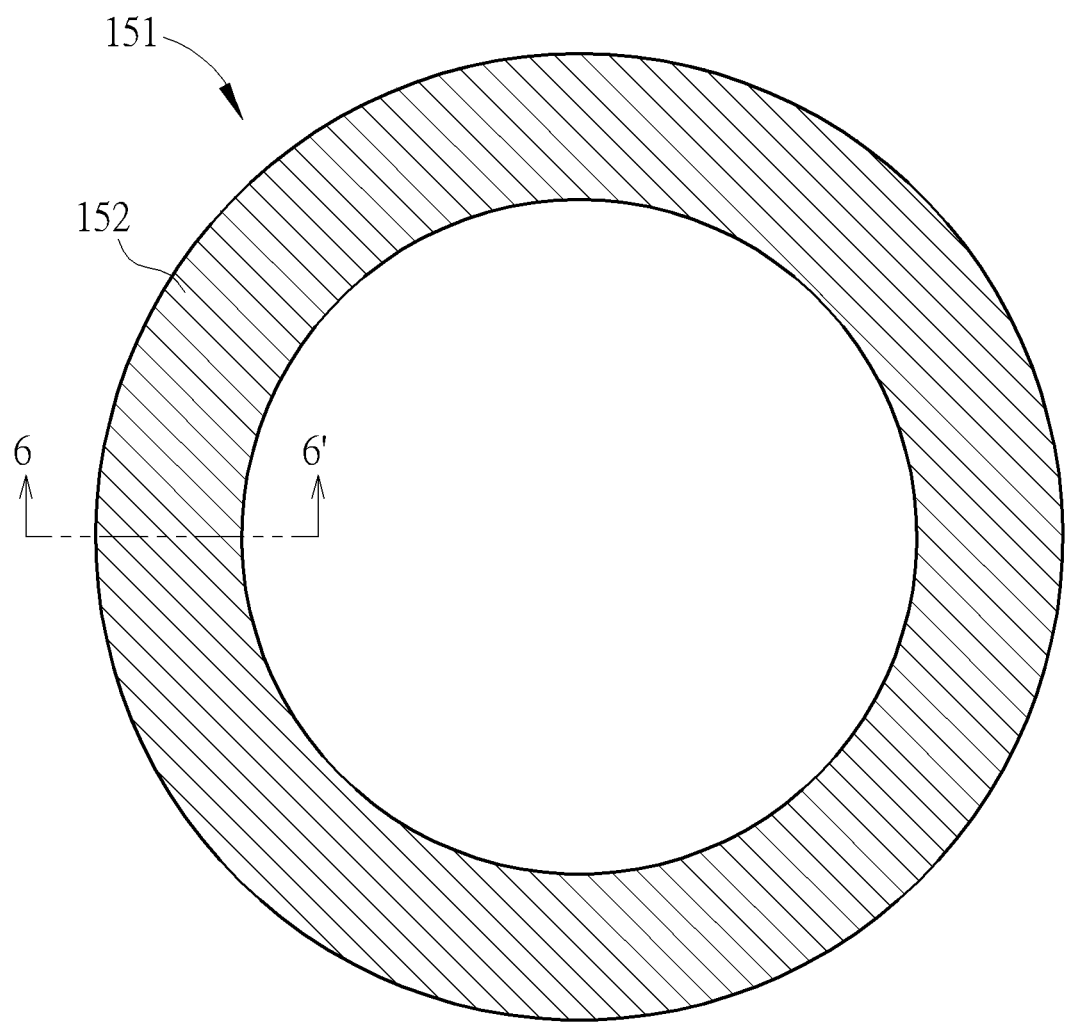
FIG. 5 is a schematic diagram of the wavelength conversion device according to an embodiment of the present invention.
Figure 6:
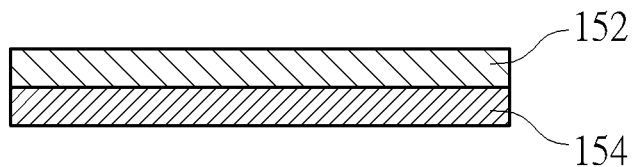
FIG. 6 is a cross-sectional diagram of the wavelength conversion device shown in FIG. 5 along a dotted line 6-6'.

Please refer to FIGS. 5 and 6. FIG. 5 is a schematic diagram of the first wavelength conversion device 151 according to an embodiment of the present invention, and FIG. 6 is a cross-sectional diagram of the first wavelength conversion device 151 along a dotted line 6-6'. The first wavelength conversion device 151 is a phosphor wheel having a disc shape. The first wavelength conversion device 151 comprises a reflection layer 154 and a first wavelength conversion layer 152. The first wavelength conversion layer 152 is a phosphor layer. The reflection layer 154 is configured to reflect the fluorescent light generated by the first wavelength conversion layer 152 so as to form the first stimulated light beam F1. As compared with the phosphor wheel 15, the first wavelength conversion device 151 lacks the penetration area 24, so the first reflected light beam R1 does not pass through the first wavelength conversion device 151. Therefore, the first wavelength conversion device 151 continues generating the first stimulated light beam F1.

Please refer to FIG. 3 again. In an embodiment of the present invention, the light source system 100 may further comprise a driving device 156 configured to rotate the first wavelength conversion device 151. The driving device 156 and the wavelength conversion device 151 form a first wavelength conversion module 150. Due to rotation of the first wavelength conversion device 151, the first reflected light beam R1 would not be constantly projected onto the same location of the first wavelength conversion device 151, improving heat dissipation efficiency of the first wavelength conversion device 151 and extending the service life of the first wavelength conversion device 151. In an embodiment of the present invention, the driving device 156 may be an electric motor.

Figure 7:
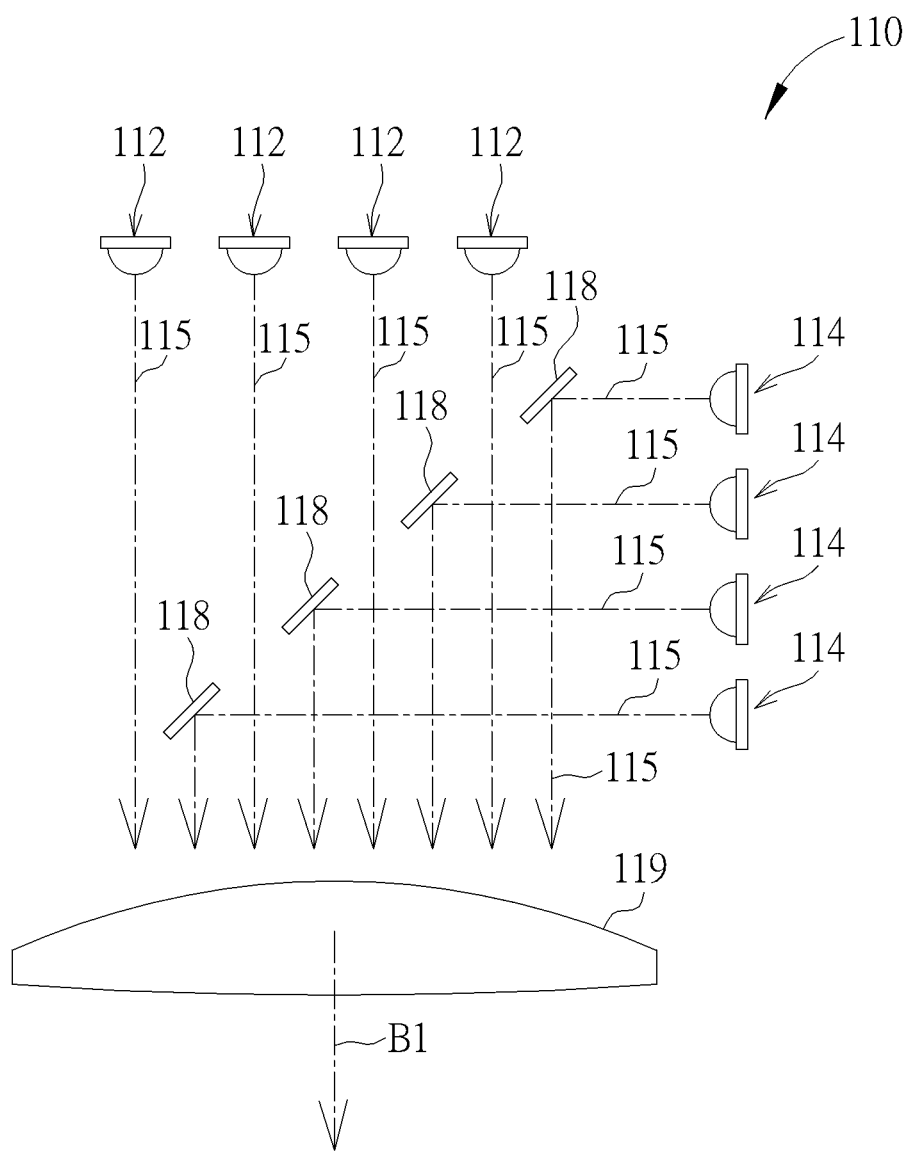
FIG. 7 is a schematic diagram showing a structure of the laser module according to an embodiment of the present invention.

In an embodiment of the present invention, each of the first laser module 110 and the second laser module 120 may comprise a plurality of laser light sources. Please refer to FIG. 7. FIG. 7 is a schematic diagram showing a structure of the first laser module 110 according to an embodiment of the present invention. In the embodiment, the first laser module 110 comprises a plurality of laser light sources 112, a plurality of laser light sources 114, a plurality of reflectors 118 and a lens 119. Each of the laser light sources 112 and 114 generates a laser light beam 115. Each laser light beam 115 from the laser light source 114 is reflected by a corresponding reflector 118 to the lens 119. The laser light beams 115 from the laser light sources 112 pass through the gaps between the reflectors 118 to the lens 119. The lens 119 integrates the laser light beams 115 from the first laser light sources 112 and 114 to form the first light beam B1. Therefore, an intensity of the first light beam B1 from the first laser module 110 would be several times of an intensity of the laser light beam 115 from a single laser light source 112 or 114. Moreover, due to the arrangement of the reflectors 118, the number of the laser light sources 112 and 114 per unit area would be reduced to improve heat dissipation efficiency of the first laser module 110. The second laser module 120 may have the same structure with the first laser module 110, and thus would not be repeated herein.

Figure 8:
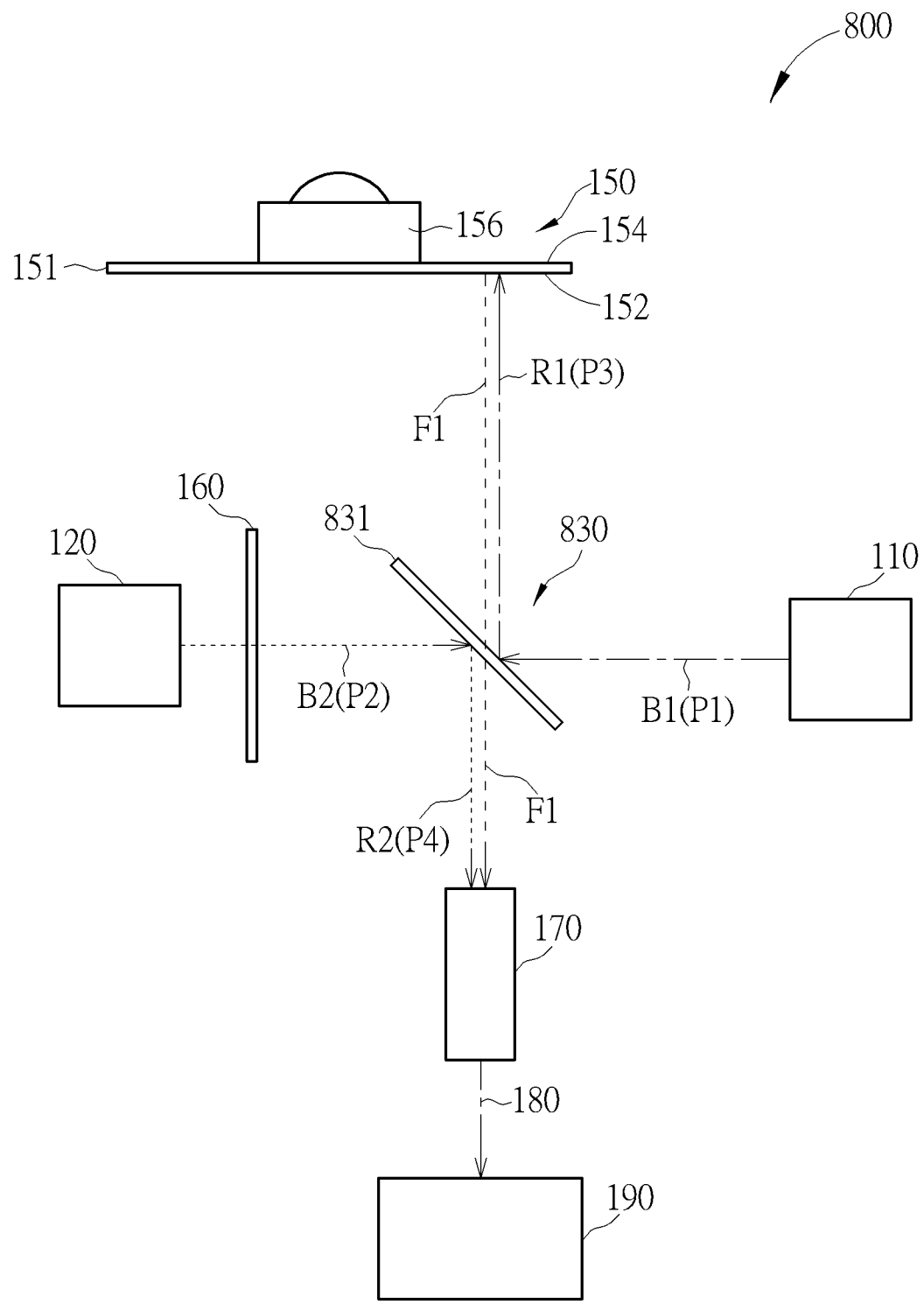
FIGS. 8 to 11 are schematic diagrams of light source systems of projectors according different embodiments of the present invention.

Please refer to FIG. 8. FIG. 8 is a schematic diagram of a light source system 800 of a projector according another embodiment of the present invention. The light source system 800 is similar to the light source system 300. The light source system 800 also comprises the first laser module 110, the second laser module 120, the first wavelength conversion device 151 and the light rod 170, and is configured to generate the integrated light beam 180 needed by the projecting system 190. The major difference between the light source system 800 and the light source system 300 is that the first light-guiding module 130 of the light source system 300 is replaced by a first light-guiding module 830 of the light source system 800 and that the first light-guiding module 830 comprises a first dichroic layer 831. The first laser module 110 of the light source system 800 is configured to generate the first light beam B1 along the first light path P1, and the second laser module 120 of the light source system 800 is configured to generate the second light beam B2 along the second light path P2. The first dichroic layer 831 reflects the first light beam B1 and the second light beam B2 to generate the first reflected light beam R1 and the second reflected light beam R2 respectively. The first reflected light beam R1 and the second reflected light beam R2 respectively travel along the third light path P3 and the fourth light path P4. In the embodiment, the first light path P1 is parallel with the second light path P2 and is perpendicular to the third light path P3 and the fourth path P4. The second light path P2 is perpendicular to the third light path P3 and the fourth light path P4. The third light path P3 is parallel with the fourth light path P4. The first wavelength conversion device 151 comprises the first wavelength conversion layer 152 configured to be stimulated by the first reflected light beam R1 to generate the first stimulated light beam F1 traveling against the first reflected light beam R1. The first dichroic layer 831 allows the first stimulated light beam F1 to pass through. Therefore, the first stimulated light beam F1 would enter the light rod 170. The light rod 170 integrates the first stimulated light beam F1 and the second reflected light beam R2 to generate the integrated light beam 180. In an embodiment of the present invention, the first laser module 110 and the second laser module 120 of the light source system 800 may be blue laser modules, the first light beam B1 and the second light beam B2 may be blue light beams, and the optical characteristics of the first dichroic layer 831 may be represented by the curve 155 shown in FIG. 4.

Figure 9:
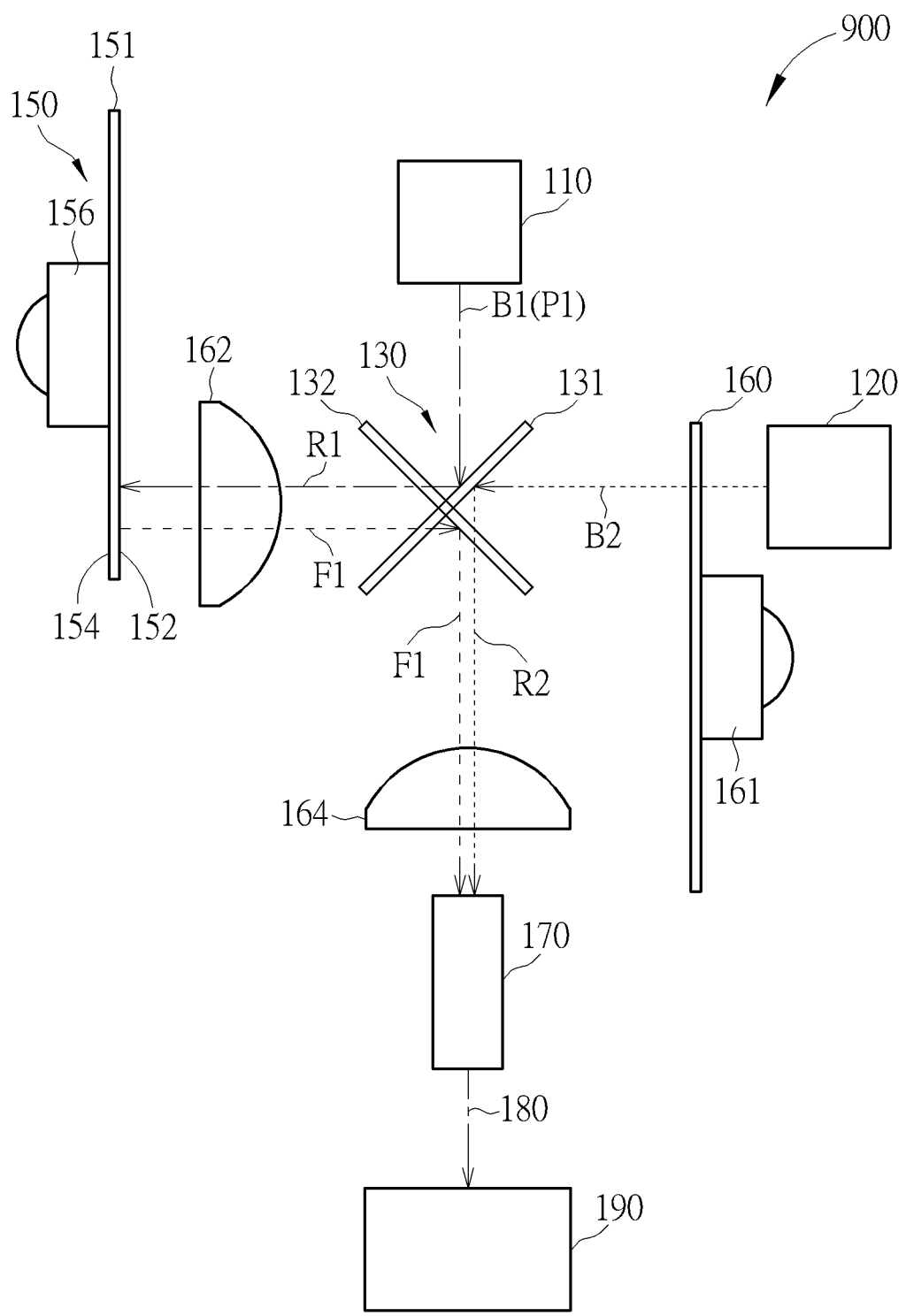
Figure 10:
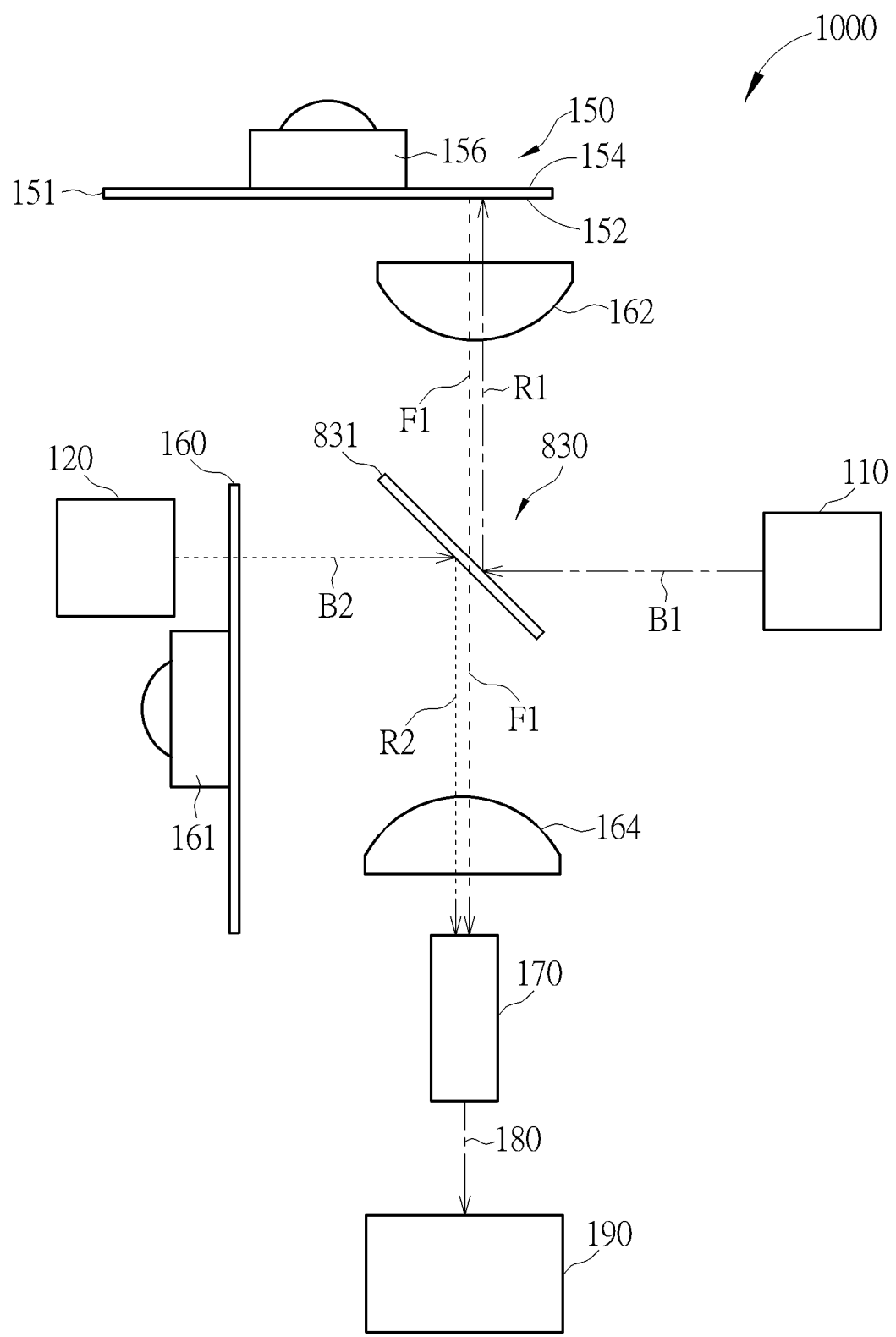

Please refer to FIGS. 3 and 8. In an embodiment of the present invention, a diffusion plate 160 may be positioned between the second laser module 120 and the first light-guiding module 130 or 830 to diffuse the second light beam B2 generated by the second laser module 120. In an embodiment of the present invention, the diffusion plate 160 may be a diffuser wheel, and the light source system 100 or 800 may further comprise a driving module for rotating the diffuser wheel 160. Please refer to FIG. 9. FIG. 9 is a schematic diagram of a light source system 900 of a projector according another embodiment of the present invention. In the embodiment, the diffusion plate 160 of the light source system 900 is a diffuser wheel. The light source system 900 is similar with the light source system 100 shown in FIG. 3. The difference between the two light source systems 100 and 900 is that the light source system 900 further comprises a driving module 161 for rotating the diffuser wheel 160. The driving device 161 may be an electric motor. In addition, the light source system 900 may further comprise lenses 162 and 164. The lens 162 is a collimator disposed between the first light-guiding module 130 and the first wavelength conversion device 151 and is configured to converge the first reflected light beam R1 and to collimate the first stimulated light beam F1. The lens 164 is a condenser disposed between the first light-guiding module 130 and the light rod 170 and is configured to converge the first stimulated light beam F1 and the second reflected light beam R2. Similarly, the driving module 161 and the two lenses 162 and 164 may be added based on the structure of the light source system 800 shown in FIG. 8 to form a light source system 1000 shown in FIG. 10.

Figure 11:
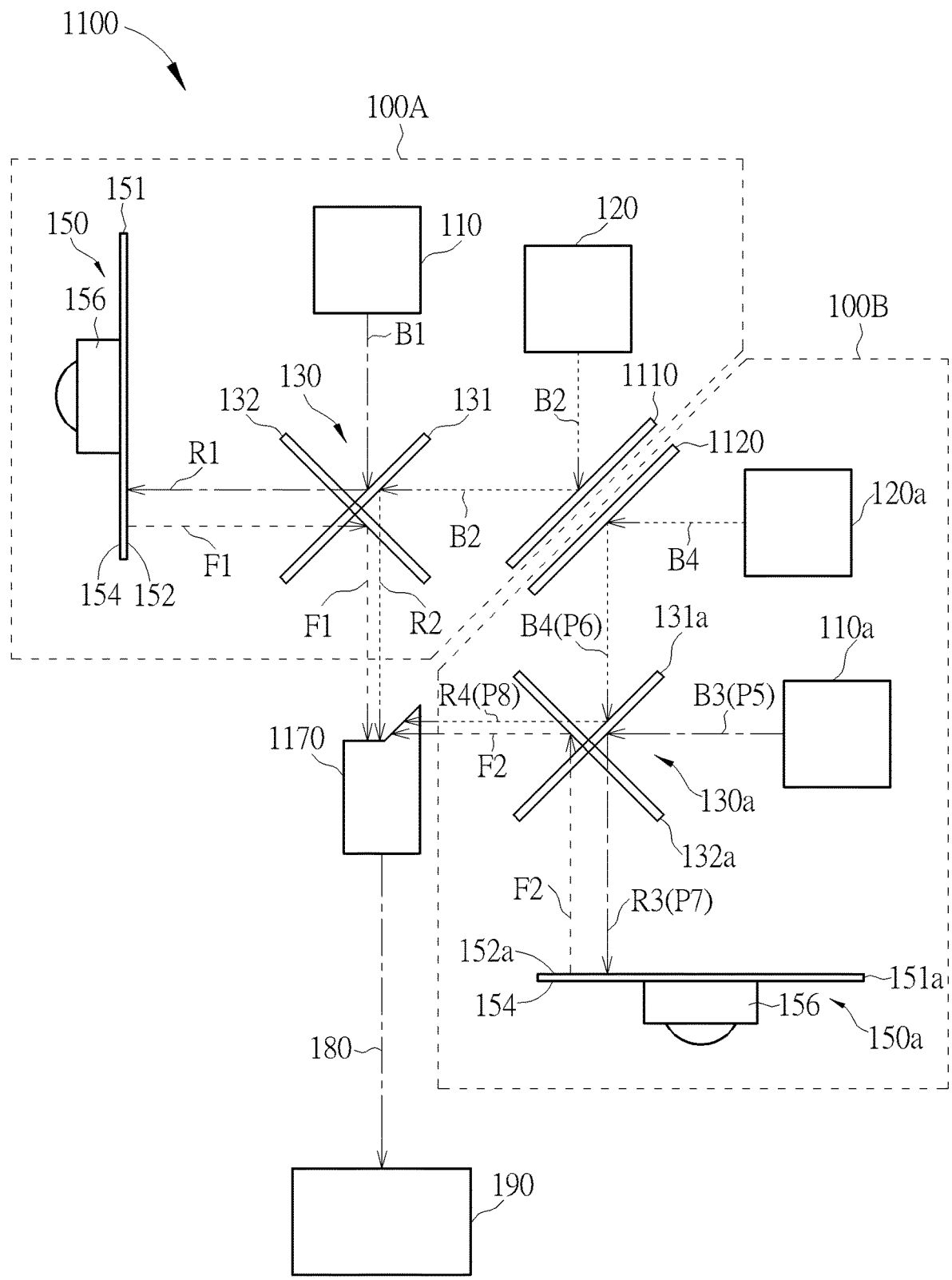

In an embodiment of the present invention, the light rod 170 may be an integrating rod disclosed by United States patent application publication NO. US 2008/0068819 A1 and be configured to integrate light beams from two different paths to generate the integrated light beam 180 needed by the projecting system 190. Please refer to FIG. 11. FIG. 11 is a schematic diagram of a light source system 1100 of a projector according another embodiment of the present invention. The light source system 1100 comprises a first subsystem 100A and a second subsystem 100B. A light rod 1170 of the light source system 1100 receives light beams from the first subsystem 100A and the second subsystem 100B to generate the integrated light beam 180. The structure of the first subsystem 100A is similar with the light source system 100 shown in FIG. 3. The first subsystem 100A comprises the first laser module 110, the second laser module 120, the first light-guiding module 130 and the first wavelength conversion device 151 and is configured to generate the second reflected light beam R2 and the first stimulated light beam F1. The structure of the second subsystem 100B is symmetrical to the first subsystem 100A, and the second subsystem 100B is configured to generate a fourth reflected light beam R4 and a second stimulated light beam F2. The second reflected light beam R2, the fourth reflected light beam R4, the first stimulated light beam F1 and the second stimulated light beam F2 would enter the light rod 1170.

Figure 12:
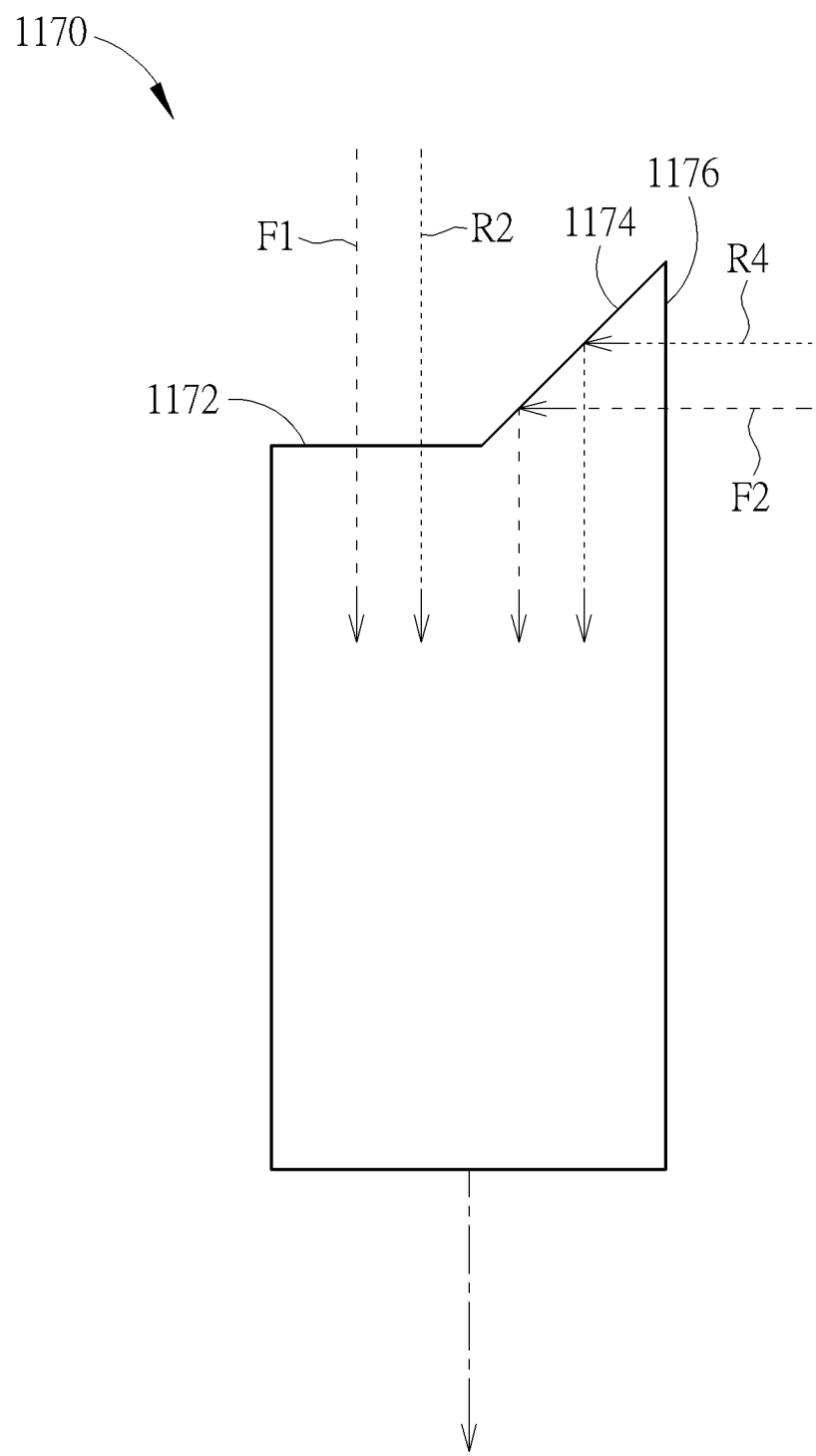
FIG. 12 is a schematic diagram of a light rod shown in FIG. 11.

Similarly, the second subsystem 100B comprises a third laser module 110a, a fourth laser module 120a, a second light-guiding module 130a and a second wavelength conversion device 151a. In the second subsystem 100B, the third laser module 110a generates a third light beam B3 along a fifth light path P5, and the fourth laser module 120a generates a fourth light beam B4 along a sixth light path P6. The second light-guiding module 130a comprises a third dichroic layer 131a and a fourth dichroic layer 132a. In addition, the second light-guiding module 130a of the second subsystem 100B reflects the third light beam B3 to generate a third reflected light beam R3 along a seventh light path P7 and reflects the fourth light beam B4 to generate the fourth reflected light beam R4 along an eighth light path P8. The second wavelength conversion layer 152a of the second wavelength conversion device 151a is stimulated by the third reflected light beam R3 to generate the second stimulated light beam F2 against the third reflected light beam R3. The second light-guiding module 130a of the second subsystem 100B guides the second stimulated light beam F2 to the eighth light path P8. The light rod 1170 may be an integrating rod disclosed by United States patent application publication NO. US 2008/0068819 A1. Please refer to FIG. 12. FIG. 12 is a schematic diagram of the light rod 1170 shown in FIG. 11. The light rod 1170 comprises a first incident surface 1172, a reflecting surface 1174 and a second incident surface 1176. The first incident surface 1172 is used to receive the first stimulated light beam F1 and the second reflected light beam R2. The second incident surface 1176 is used to receive the second stimulated light beam F2 and the fourth reflected light beam R4. The reflecting surface 1174 forms a predetermined angle with the first incident surface 1172 and is inclined towards the second incident surface 1176 to reflect the second stimulated light beam F2 and the fourth reflected light beam R4. The predetermined angle between the reflecting surface 1174 and the first incident surface 1172 may be 135 degrees, but the present invention is not limited thereto. After being reflected by the reflecting surface 1174, the second stimulated light beam F2 and the fourth reflected light beam R4 are travelling along a similar direction or the same direction as the first stimulated light beam F1 and the second reflected light beam R2. The light rod 1170 integrates the first stimulated light beam F1, the second stimulated light beam F2, the second reflected light beam R2 and the fourth reflected light beam R4 to generate the integrated light beam 180. It should be noted that the structure of the light rod 1170 is not limited to that illustrated in FIG. 12. The light rod 1170 may be chosen from different integrating rods disclosed by United States patent application publication NO. US 2008/0068819 A1 according to the final product design.

Please refer to FIG. 11 again. In the embodiment, the fifth light path P5 is perpendicular to both the light sixth path P6 and the seventh light path P7 and is parallel with the eighth light path P8. The sixth light path P6 is parallel with the seventh light path P7 and is perpendicular to the eighth light path P8. The seventh light path P7 is perpendicular to the eighth light path P8. In addition, the second light-guiding module 130a of the second subsystem 100B comprises a first dichroic layer 131 and a second dichroic layer 132. The first dichroic layer 131 reflects the third light beam B3 and the fourth light beam B4 to generate the third reflected light beam R3 and the fourth reflected light beam R4 respectively, and the first dichroic layer 131 allows the second stimulated light beam F2 to pass through. The second dichroic layer 132 reflects the second stimulated light beam F2 to redirect the second stimulated light beam F2 to the eighth light path P8, and the second dichroic layer 132 allows the third reflected light beam R3, the fourth reflected light beam R4 and the third light beam B3 to pass through.

In an embodiment of the present invention, in order to further reduce the size of the light source system 1100, the light source system 1100 may further comprise a first reflector 1110 and a second reflector 1120. The first reflector 1110 is disposed in the first subsystem 100A to reflect the second light beam B2 to the second light-guiding module 130a of the first subsystem 100A. The second reflector 1120 is disposed in the second subsystem 100B to reflect the fourth light beam B4 to the second light-guiding module 130a of the second subsystem 100B.

Figure 13:
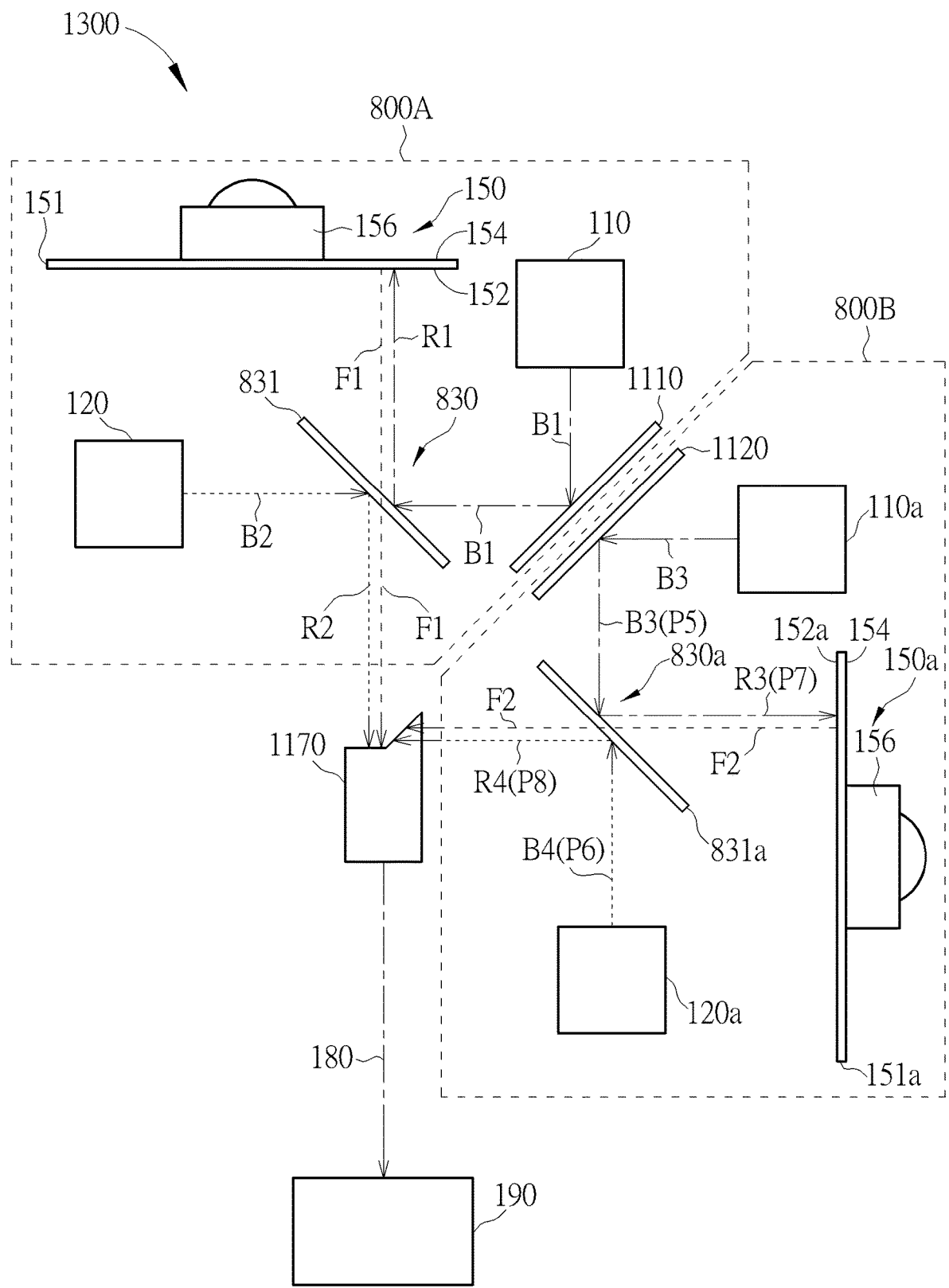
FIGS. 13 to 14 are schematic diagrams of light source systems of projectors according different embodiments of the present invention.

The first subsystem 100A and the second subsystem 100B of the first light source system 1100 may use the structure of the light source system 800 shown in FIG. 8. Please refer to FIG. 13. FIG. 13 is a schematic diagram of a light source system 1300 of a projector according another embodiment of the present invention. The light source system 1300 comprises a first subsystem 800A and a second subsystem 800B. The structure of the first subsystem 800A is similar with the light source system 800 shown in FIG. 8, and the structure of the second subsystem 800B is symmetrical to the first subsystem 800A. The first subsystem 800A comprises the first laser module 110, the second laser module 120, the first light-guiding module 830 and the first wavelength conversion device 151 and is configured to generate the second reflected light beam R2 and the first stimulated light beam F1 that would enter the light rod 1170.

The second subsystem 800B comprises a third laser module 110a, a fourth laser module 120a, a second light-guiding module 830a and a second wavelength conversion device 151a. In the second subsystem 800B, the third laser module 110a generates the third light beam B3 along the fifth light path P5, and the fourth laser module 120a generates the fourth light beam B4 along the sixth light path P6. The second light-guiding module 830a comprises a third dichroic layer 831a. In addition, the second light-guiding module 830a of the second subsystem 800B reflects the third light beam B3 to generate the third reflected light beam R3 along the seventh light path P7 and reflects the fourth light beam B4 to generate the fourth reflected light beam R4 along the eighth light path P8. The second wavelength conversion layer 152a of the second wavelength conversion device 151a is stimulated by the third reflected light beam R3 to generate the second stimulated light beam F2 against the third reflected light beam R3. The second light-guiding module 830a of the second subsystem 800B allows the second stimulated light beam F2 to pass through to the eighth light path P8. The light rod 1170 integrates the first stimulated light beam F1, the second stimulated light beam F2, the second reflected light beam R2 and the fourth reflected light beam R4 to generate the integrated light beam 180.

In the embodiment, the fifth light path P5 is parallel with the sixth light path P6 and is perpendicular to both the seventh light path P7 and the eighth light path P8. The sixth light path P6 is perpendicular to both the seventh light path P7 and the eighth light path P8. The seventh light path P7 is parallel with the eighth light path P8. The second light-guiding module 830a of the second subsystem 800B comprises the third dichroic layer 831a to reflect the third light beam B3 and the fourth light beam B4 so as to generate the third reflected light beam R3 and the fourth reflected light beam R4 respectively. In addition, the third dichroic layer 831a of the second subsystem 800B allows the second stimulated light beam F2 to pass through.

Moreover, the light source system 1300 may further comprise a first reflector 1110 and a second reflector 1120. The first reflector 1110 is disposed in the first subsystem 100A to reflect the first light beam B1 to the second light-guiding module 830a of the first subsystem 800A. The second reflector 1120 is disposed in the second subsystem 800B to reflect the third light beam B3 to the second light-guiding module 830a of the second subsystem 800B.

Figure 14:
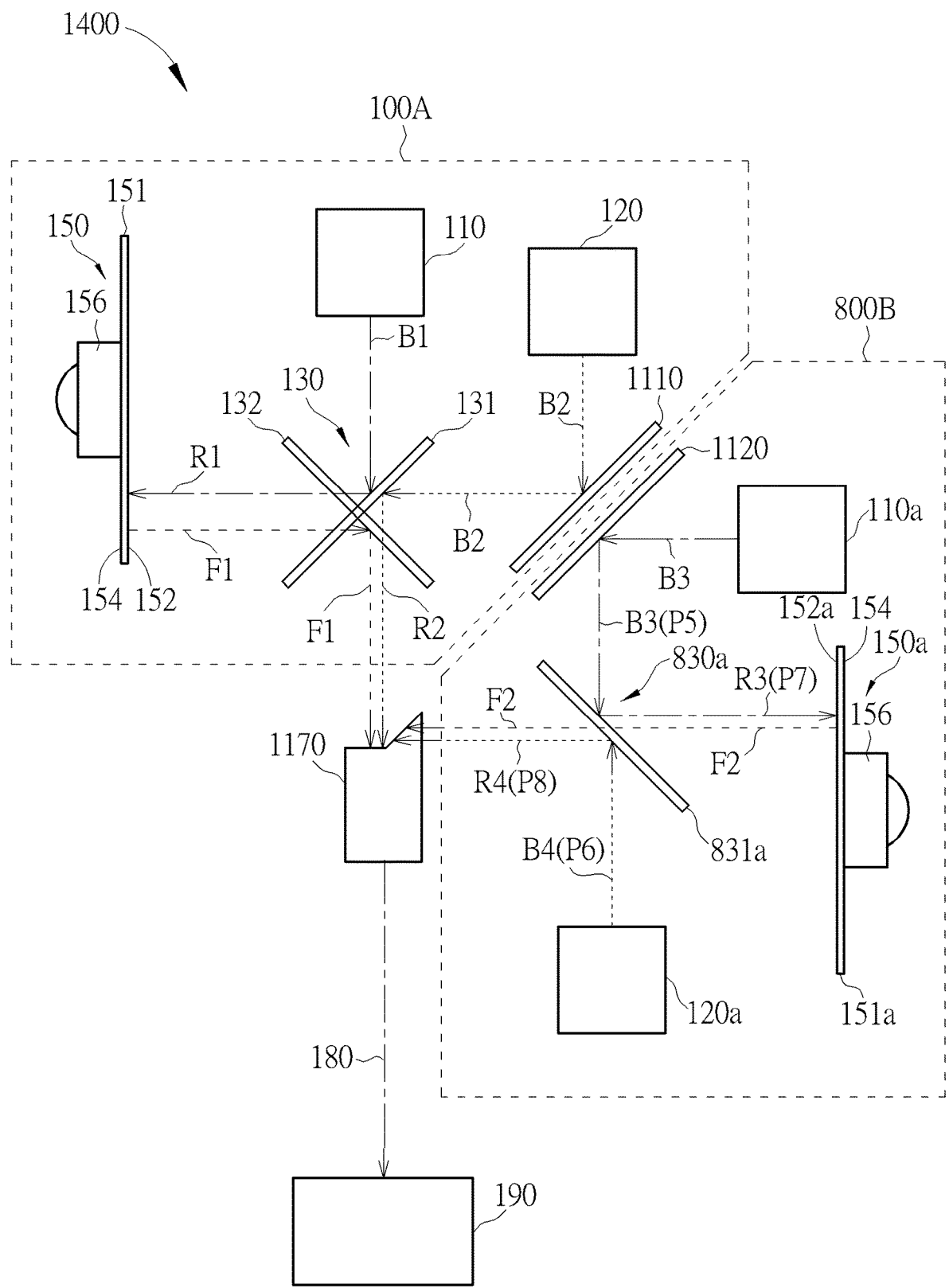

Please refer to FIG. 14. FIG. 14 is a schematic diagram of a light source system 1400 of a projector according another embodiment of the present invention. The light source system 1400 is similar with the light source system 1100 shown in FIG. 11. The major difference between the two light source systems 1100 and 1400 is that the second subsystem 100B of the light source system 1100 is replace by the second subsystem 800B of the light source system 1400. The operations of the first subsystem 100A and the second subsystem 800B have been described previously and thus would not be repeated herein. In another embodiment of the present invention, the second subsystem 800B shown in FIG. 13 may be replaced by the second subsystem 100B shown in FIG. 11. In other words, the first subsystem and the second subsystem of the light source system may be the first subsystem 800A and the second subsystem 100B respectively, the first subsystem 800A generates the first stimulated light beam F1 and the second reflected light beam R2, and the second subsystem 100B generates the second stimulated light beam F2 and the fourth reflected light beam R4.

According to the embodiments of the present invention, the light source system operates normally without a relay system, so the size of the light source system could be reduced substantially. Moreover, since the light source system has two laser modules, the spectral energy distribution of the integrated light beam outputted from the light source system could be dynamically adjusted to fit various projection demands by adjusting the output power or the numbers of laser diodes of the laser modules.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A light source system of a laser projector for generating an integrated light beam, the light source system comprising:
   a first laser module configured to generate a first light beam along a first light path;
   a second laser module configured to generate a second light beam along a second light path;
   a first light-guiding module configured to reflect the first light beam to generate a first reflected light beam along a third light path, and reflect the second light beam to generate a second reflected light beam along a fourth light path, the first light-guiding module comprising:
      a first dichroic layer configured to reflect the first light beam and the second light beam to generate the first reflected light beam and the second reflected light beam respectively, wherein the first dichroic layer allows the first stimulated light beam to pass through; and
      a second dichroic layer configured to reflect a first stimulated light beam to the fourth light path, wherein the second dichroic layer allows the first reflected light beam and the second reflected light beam to pass through;
   a first wavelength conversion device having a first wavelength conversion layer configured to be stimulated by the first reflected light beam to generate the first stimulated light beam traveling against the first reflected light beam, wherein the first light-guiding module directs the first stimulated light beam to the fourth light path; and
   a light rod configured to integrate the first stimulated light beam and the second reflected light beam to generate the integrated light beam;
   wherein the first light path is perpendicular to both the second light path and the third light path and is parallel with the fourth light path, the second light path is parallel with the third light path and is perpendicular to the fourth light path, and the third light path is perpendicular to the fourth light path.

2. The light source system of claim 1, wherein the first dichroic layer and the second dichroic layer are disposed in perpendicular to one another to form an X plate.

3. A light source system of a laser projector for generating an integrated light beam, the light source system comprising:
   a first laser module configured to generate a first light beam along a first light path;
   a second laser module configured to generate a second light beam along a second light path;
   a first light-guiding module configured to reflect the first light beam to generate a first reflected light beam along a third light path, and reflect the second light beam to generate a second reflected light beam along a fourth light path, the first light-guiding module comprising:
      a first dichroic layer configured to reflect the first light beam and the second light beam to generate the first reflected light beam and the second reflected light beam respectively, wherein the first dichroic layer allows a first stimulated light beam to pass through;
   a first wavelength conversion device having a first wavelength conversion layer configured to be stimulated by the first reflected light beam to generate the first stimulated light beam traveling against the first reflected light beam, wherein the first light-guiding module directs the first stimulated light beam to the fourth light path; and a light rod configured to integrate the first stimulated light beam and the second reflected light beam to generate the integrated light beam;

wherein the first light path is parallel with the second light path and is perpendicular to the third light path and the fourth light path, the second light path is perpendicular to the third light path and the fourth light path, and the third light path is parallel with the fourth light path.

4. The light source system of claim 3, wherein the first wavelength conversion layer is a phosphor layer.

5. The light source system of claim 3 further comprising a diffusion plate positioned between the second laser module and the first light-guiding module to diffuse the second light beam.

6. The light source system of claim 5, wherein the diffusion plate is a diffuser wheel, and the light source system further comprises a driving module for rotating the diffuser wheel.

7. A light source system of a laser projector for generating an integrated light beam, the light source system comprising:
   a first laser module configured to generate a first light beam along a first light path;
   a second laser module configured to generate a second light beam along a second light path;
   a first light-guiding module configured to reflect the first light beam to generate a first reflected light beam along a third light path, and reflect the second light beam to generate a second reflected light beam along a fourth light path;
   a first wavelength conversion device having a first wavelength conversion layer configured to be stimulated by the first reflected light beam to generate a first stimulated light beam traveling against the first reflected light beam, wherein the first light-guiding module directs the first stimulated light beam to the fourth light path;
   a third laser module configured to generate a third light beam along a fifth light path;
   a fourth laser module configured to generate a fourth light beam along a sixth light path;
   a second light-guiding module configured to reflect the third light beam to generate a third reflected light beam along a seventh light path, and reflect the fourth light beam to generate a fourth reflected light beam along an eighth light path;
   a second wavelength conversion device having a second wavelength conversion layer configured to be stimulated by the third reflected light beam to generate a second stimulated light beam traveling against the third reflected light beam, wherein the second light-guiding module directs the second stimulated light beam to the eighth light path; and
   a light rod configured to integrate the first stimulated light beam, the second stimulated light beam, the second reflected light beam and the fourth reflected light beam to generate the integrated light beam.

8. The light source system of claim 7, wherein the fifth light path is perpendicular to both the sixth light path and the seventh light path and is parallel with the eighth light path, the sixth light path is parallel with the seventh light path and is perpendicular to the eighth light path, the seventh light path is perpendicular to the eighth light path, and the second light-guiding module comprises:
   a third dichroic layer configured to reflect the third light beam and the fourth light beam to generate the third reflected light beam and the fourth reflected light beam respectively, wherein the third dichroic layer allows the second stimulated light beam to pass through; and
   a fourth dichroic layer configured to reflect the second stimulated light beam to the eighth light path, wherein the fourth dichroic layer allows the third reflected light beam and the fourth reflected light beam to pass through.

9. The light source system of claim 7, wherein the fifth light path is parallel with the sixth light path and is perpendicular to the seventh light path and the eighth light path, the sixth light path is perpendicular to both the seventh light path and the eighth light path, the seventh light path is parallel with the eighth light path, and the second light-guiding module comprises:
   a third dichroic layer configured to reflect the third light beam and the fourth light beam to generate the third reflected light beam and the fourth reflected light beam respectively, wherein the third dichroic layer allows the second stimulated light beam to pass through.

10. The light source system of claim 7 further comprising a first reflector and a second reflector, wherein the first reflector reflects the second light beam to the first light-guiding module, and the second reflector reflects the fourth light beam to the second light-guiding module.

11. The light source system of claim 7 further comprising a first reflector and a second reflector, wherein the first reflector reflects the first light beam to the first light-guiding module, and the second reflector reflects the third light beam to the second light-guiding module.

12. The light source system of claim 7, wherein the first laser module, the second laser module, the third laser module and the fourth laser module are blue laser modules.

13. The light source system of claim 7, wherein the light rod comprises:
   a first incident surface, corresponding to the first light-guiding module for receiving the first stimulated light beam and the second reflected light beam;
   a second incident surface, corresponding to the second light-guiding module for receiving the second stimulated light beam and the fourth reflected light beam; and
   a reflecting surface forming a predetermined angle with the first incident surface and slanted towards the second incident surface for reflecting the second stimulated light beam and the fourth reflected light beam.

\* \* \* \* \*